United States Patent [19]

Cole et al.

[11] Patent Number: 4,926,496

[45] Date of Patent: May 15, 1990

[54] METHOD AND APPARATUS FOR INFREQUENT RADIO USERS TO SIMPLY OBTAIN EMERGENCY ASSISTANCE

[75] Inventors: Robert E. Cole, Lynchburg; Fredrick E. Spangler, Huddleston, both of Va.

[73] Assignee: General Electric Company, Lynchburg, Va.

[21] Appl. No.: 85,491

[22] Filed: Aug. 14, 1987

[51] Int. Cl.$^5$ .......................... H04B 1/40; H01J 7/04

[52] U.S. Cl. ..................................... 455/77; 455/17; 455/34; 455/54; 370/95.1; 379/63

[58] Field of Search ............. 455/17, 77, 76, 185–186, 455/34, 54; 370/95; 379/59, 60, 63

[56] References Cited

U.S. PATENT DOCUMENTS

| | | | |
|---|---|---|---|
| 3,292,178 | 0/1966 | Magnuski | 455/63 |
| 3,458,664 | 0/1969 | Adlhoch et al. | |
| 3,571,519 | 0/1971 | Tsimbidis | |
| 3,696,210 | 0/1972 | Peterson et al. | |
| 3,801,956 | 0/1974 | Braun et al. | |
| 3,906,166 | 0/1975 | Cooper et al. | 379/60 |
| 3,936,616 | 0/1976 | DiGianfilippo | 379/63 |
| 3,970,801 | 0/1976 | Ross et al. | 379/63 |
| 4,001,693 | 1/1977 | Stackhouse et al. | 325/58 |
| 4,010,327 | 0/1977 | Kobrinetz et al. | 379/58 |
| 4,012,597 | 0/1977 | Lynk, Jr. et al. | 455/53 |
| 4,022,973 | 0/1977 | Stackhouse | 375/114 |
| 4,027,243 | 0/1977 | Stackhouse | 375/114 |
| 4,029,901 | 0/1977 | Campbell | 379/58 |
| 4,128,740 | 0/1978 | Graziano | 455/33 |
| 4,131,849 | 0/1978 | Freeburg et al. | 375/5 |
| 4,184,118 | 0/1980 | Cannalte et al. | 370/77 |
| 4,231,114 | 0/1980 | Dolikian | 455/49 |
| 4,267,593 | 0/1981 | Craiglow | 370/62 |
| 4,309,772 | 0/1982 | Kloker et al. | 375/76 |
| 4,312,070 | 0/1982 | Coombes et al. | 371/40 |
| 4,312,074 | 0/1982 | Pautler et al. | 375/96 |
| 4,322,576 | 0/1982 | Miller | 380/29 |
| 4,326,264 | 4/1982 | Cohen et al. | 364/900 |
| 4,339,823 | 0/1982 | Predina et al. | 375/20 |
| 4,347,625 | 8/1982 | Williams | 455/17 |
| 4,360,927 | 11/1982 | Bowen et al. | 455/17 |
| 4,369,443 | 1/1983 | Giallanza et al. | 340/825.47 |
| 4,382,298 | 0/1983 | Evans | 371/6 |
| 4,400,585 | 0/1982 | Kamen et al. | 379/63 |
| 4,409,687 | 0/1983 | Berti et al. | 455/7 |
| 4,418,425 | 0/1983 | Fennel, Jr. et al. | 380/33 |
| 4,430,742 | 0/1984 | Milleker et al. | 375/5 |
| 4,430,755 | 2/1984 | Nadir et al. | 455/77 |
| 4,433,256 | 0/1984 | Dolikian | 307/358 |
| 4,434,323 | 0/1984 | Levine et al. | 380/48 |
| 4,450,573 | 0/1984 | Noble | 375/104 |
| 4,485,486 | 0/1984 | Webb et al. | 455/33 |
| 4,578,815 | 0/1986 | Persinotti | 455/15 |
| 4,658,435 | 7/1984 | Childress et al. | 455/17 |
| 4,698,805 | 10/1987 | Sasuta et al. | 370/97 |

OTHER PUBLICATIONS

Federal Information Processing Standards, Pub. No. 46, Data Encryption Standard, U.S. Dept. of Comm., NTIS, (5285 Port Royal Rd., Springfield, Va. 22161).

Primary Examiner—Thomas H. Tarcza
Assistant Examiner—John B. Sotomayor
Attorney, Agent, or Firm—Nixon & Vanderhye

[57] ABSTRACT

A digital mobile radio transceiver allows even the most unsophisticated user to simply and easily obtain emergency communications. The transceiver is programmed with "personality" data specifying one or more "systems", each "system" specifying one or more "groups" of or individual radio transceivers. Systems are selected by operating a first selector switch, and groups are selected by operating a second selector switch. The transceiver simultaneously displays the "group" and "system" which have been selected. One or more group identification codes uniquely designate an emergency communications handler (e.g., an emergency dispatch operator). The group designated by the transceiver group selector switch position "9" of each system programmed into the radio transceiver corresponds to this emergency group identification code. Moreover, the "system" designated by system selector switch "11" has only one "group"—the emergency group identification code corresponding to the group selector position "9". Whenever the user operates the selector switches to select the group "9" and the system "11" (causing the transceiver to display "911"), the emergency group identification code is selected. Similarly, whenever the user selects group "9" and any system, the emergency operator is selected; and whenever the user selects system "11", he can *only* select group "9" corresponding to the emergency operator.

15 Claims, 4 Drawing Sheets

METHOD AND APPARATUS FOR INFREQUENT RADIO USERS TO SIMPLY OBTAIN EMERGENCY ASSISTANCE

CROSS-REFERENCE TO RELATED APPLICATIONS

This application is related to the following commonly-assigned U.S. patent applications: U.S. patent application Ser. No. 056,922 of Childress et al filed June 3, 1987 entitled "Trunked Radio Repeater System" (Attorney Docket No. 46-66; Client Reference No. 45-MR-539); U.S. patent application Ser. No. 057,046 of Childress et al filed June 3, 1987 entitled "Failsoft Architecture for Public Trunking System" (Attorney Docket No. 46-72; Client Reference No. 45-MR-541); U.S. patent application Ser. No. 056,924 of Childress filed June 3, 1987 entitled "Adaptive Limiter/Detector Which Changes Time Constant Upon Detection of Dotting Pattern" (Attorney Docket No. 46-68; Client Reference No. 45-MR-508); U.S. patent application Ser. No. 056,923 of Childress et al filed June 3, 1987 entitled "Apparatus and Method for Transmitting Digital Data Over a Radio Communications Channel" (Attorney Docket No. 46-13; Client Reference No. 45-MR-496). This application is also related to the following commonly-assigned copending applications filed on Aug. 14, 1987: U.S. patent application Ser. No. 085,572 of Nazarenko et al entitled "Processor-to-Processor Communications Protocol for a Public Service Trunking System" (Attorney Docket No. 46-73; Client Reference No. 45-MR-542); U.S. patent application Ser. No. 085,663 of Hall et al entitled "Radio Trunking Fault Detection System" (Attorney Docket No. 46-81; Client Reference No. 45-MR-555); and U.S. patent application Ser. No. 085,490 of Dissosway et al entitled "Mobile Radio Interface" (Attorney Docket No. 46-80; Client Reference No. 45-MR-549). The disclosures of each of those related copending patent applications are also incorporated by reference herein.

This invention is generally related to the art of trunked radio repeater systems. The invention more particularly relates to such repeater systems using digital control signals transmitted over a dedicated control channel while also using plural working channels which are assigned temporarily for use by individual mobile radio units.

The trunking of radio repeaters is well known. Early trunking systems used analog control signals while some more recent systems have utilized digital control signals. Control signals have been used on a dedicated control channel and/or on different ones of the working (voice) channels for various different reasons and effects. A nonexhaustive but somewhat representative sampling of publications and patents describing typical prior art trunked radio repeater systems is set forth below:

U.S. Pat. No. 3,292,178 Magnuski (1986),
U.S. Pat. No. 3,458,664 R. H. Adlhoch et al (1969),
U.S. Pat. No. 3,571,519 Tsimbidis (1971),
U.S. Pat. No. 3,696,210 Peterson et al (1972),
U.S. Pat. No. 3,906,166 Cooper et al (1975),
U.S. Pat. No. 3,936,616 DiGianfilippo (1976),
U.S. Pat. No. 3,970,801 Ross et al (1976),
U.S. Pat. No. 4,001,693 Stackhouse et al (1977),
U.S. Pat. No. 4,010,327 Kobrinetz et al (1977),
U.S. Pat. No. 4,012,597 Lynk, Jr. et al (1977),
U.S. Pat. No. 4,022,973 Stackhouse et al (1977),
U.S. Pat. No. 4,027,243 Stackhouse et al (1977),
U.S. Pat. No. 4,029,901 Campbell (1977),
U.S. Pat. No. 4,128,740 Graziano (1978),
U.S. Pat. No. 4,131,849 Freeburg et al (1978),
U.S. Pat. No. 4,184,118 Cannalte et al (1980),
U.S. Pat. No. 4,231,114 Dolikian (1980),
U.S. Pat. No. 4,309,772 Kloker et al 1982,
U.S. Pat. No. 4,312,070 Coombes et al (1982),
U.S. Pat. No. 4,312,074 Pautler et al (1982),
U.S. Pat. No. 4,326,264 Cohen et al (1982),
U.S. Pat. No. 4,339,823 Predina et al (1982),
U.S. Pat. No. 4,347,625 Williams (1982),
U.S. Pat. No. 4,360,927 Bowen et al 1982,
U.S. Pat. No. 4,400,585 Kaman et al 1983,
U.S. Pat. No. 4,409,687 Berti et al (1983),
U.S. Pat. No. 4,430,742 Milleker et al (1984),
U.S. Pat. No. 4,430,755 Nadir et al (1984),
U.S. Pat. No. 4,433,256 Dolikian (1984),
U.S. Pat. No. 4,450,573 Noble (1984),
U.S. Pat. No. 4,485,486 Webb et al (1984),
U.S. Pat. No. 4,578,815 Persinotti (1985).

Bowen et al is one example of prior art switched channel repeater systems which avoid using a dedicated control channel—in part by providing a handshake with the repeater site controller from a seized "idle" working channel before communication with a called unit(s) is permitted to proceed.

There are many actual and potential applications for trunked radio repeater systems. However, one of the more important applications is for public service trunked (PST) systems. For example, a single system of trunked radio repeaters may be advantageously used by an entire metropolitan area to provide efficient radio communications between individual radio units within many different agencies. Each agency may, in turn, achieve efficient communication between individual units of different fleets or subunits (e.g., the police department may have a need to provide efficient communications between different units of its squad car force, different portable units assigned to foot patrolmen, different units of detectives who are narcotics agents, and the like). Sometimes it may be important to communicate simultaneously with predefined groups of units (e.g., all units, all squad cars, all foot patrolmen, etc.). At the same time, other agencies (e.g., the fire department, the transportation department, the water department, the emergency/rescue services, etc.) may be in need of similar communication services. As is well known to those familiar with trunking theory, a relatively small number of radio repeaters can efficiently service all of these needs within a given geographical area if they are trunked (i.e., shared on an "as-needed" basis between all potential units).

The potential advantages of trunked radio repeater systems for public services is so well recognized that an organization known as the Association of Public-Safety Communications Officers, Inc. (formerly the Association of Police Communications Officers) (APCO) has developed a set of highly desirable features for such a system commonly known as the "APCO-16 Requirements." A complete listing and explanation of such requirements may be found in available publications known to those in the art.

An advantageous trunked radio repeater system is described in copending, commonly-assigned Application Serial No. 056,922 of Childress et al entitled "Trunked Radio Repeater System" filed June 3, 1987

(Attorney Docket No. 46-66). That application describes a trunked radio repeater system architecture in which the RF "control shelf" which receives and transmits radio frequency signals for a particular working or control channel is controlled by a microprocessor-based "trunking card" (hereafter referred to as a "GETC"—General Electric Trunking Card) which performs the signal processing functions associated with the control shelf and RF channel. A primary site controller (e.g., a minicomputer) is connected to various trunking cards, and receives digital signals from and sends digital signals to the various trunking cards. The primary site controller performs the control functions of the system (during normal system operations)—and thus performs tasks such as call logging, dynamic regrouping, and "patch" coordination as well as other, more route control functions such as assigning channels to new calls. One or more dispatch consoles also connected to the primary site controller generate messages controlling the primary site controller and also monitor the status of the entire system via messages sent to it from the site controller.

Not so long ago, mobile radio transceiver installations were limited to a trunk-mounted mobile radio transceiver unit connected via a multiple conductor cable to a dashboard-mounted control head. The control head was typically relatively simple, including only an ON-OFF switch, a volume control, a microphone with associated PTT (push to talk) and hook switches, a speaker, receive/transmit indicator lamps, and a channel selector switch.

The channel selector switch was hard-wired for specific crystal-controlled frequencies, and the transceiver always transmitted and received on the same set of frequencies (e.g., a set of frequencies dedicated to emergency communications and always monitored by an emergency dispatch operator) when the channel selector switch was switched into a given position. Users typically would adhere mnemonic labels on the control head itself adjacent to channel switch positions to help them remember which channels were which, or refer to a table of channel allocations attached to the vehicle dashboard. Such radios were relatively simple to operate even by unsophisticated users.

Significantly, RF channels typically are not used to select desired call participants in modern digitally trunked radio repeater systems. In past systems, for example, all police units and the police dispatcher might normally monitor "channel 1", so that a user wishing to contact the police dispatcher needed only to transmit on channel "1". In some radio services (e.g., the 27 mHz Citizen's Band, the low frequency and VHF marine bands, and the aviation radio bands), specific operating frequencies have been set aside exclusively for emergency communications use. For example, by law, Citizen's Band channel 9 (a frequency around 27.1 mHz) can be used only for emergency communications, and many police stations and other public service agencies throughout the country monitor this frequency. To make an emergency call using a Citizen's Band transceiver, a user tunes to channel 9 and transmits.

Modern "digital" mobile radio transceivers (i.e., transceivers controlled by microprocessors) are not limited to the crude control functions provided in mobile radio transceivers of the past. For example, modern digital radio transceivers include much internal digital control circuitry (e.g., digitally-controlled frequency synthesizers, digital displays, etc.). Transceiver operating frequencies are now controlled by digital frequency synthesizers in response to user selections made via control head push buttons or knobs.

Typically, all mobile transceivers in a digitally trunked radio communications system monitor a digital control channel when they are not engaged in actual communications. Transceivers are identified by "group" and "individual" identification codes (long digital data strings). When a transceiver detects a "working" channel assignment message which specifies a transceiver "group" or "individual" identification code it is a member of, the transceiver ceases monitoring the RF control channel and changes frequency to the "working" channel—where it participates in communications. After the communications end, the transceiver ceases operating on the working channel and reverts back to monitoring the control channel.

If a mobile radio user in such a digitally trunked radio communications system wishes to contact another transceiver or a dispatcher, the user controls his transceiver to transmit a channel assignment request message on the control channel, this channel assignment request message specifying the group or individual identification code of the transceiver(s) he wishes to contact. The repeater system responds by transmitting a channel assignment message directing the calling transceiver and all of the transceivers the user wishes to contact onto a working channel frequency where communications is to take place.

Needless to say, it would be too much to expect users to remember and key in the group and individual identification codes of parties they wish to call. Accordingly, modern digital radio transceivers include internal preprogrammed EEPROM memory devices which store tables of group and individual identification codes and associate entries in those tables with corresponding positions of a group/individual call selector switch(es). When the user operates the selector switch, his transceiver automatically reads a corresponding entry from the internal memory device and thus obtains an individual or group identification code. The transceiver then automatically transmits the code so obtained to the repeater station over the system RF control channel with a channel assignment request message.

From a user standpoint, then, selection of a group or individual using the selector switch is the equivalent to selecting a "channel" on a radio transceiver of the past. Nevertheless, operating a modern digital transceiver of this type can be a difficult and challenging experience to an unsophisticated user. With digital transceivers now being installed where radios never were present before (e.g., in city and county service vehicles such as garbage trucks, school buses and the like), a large number of people who never used radio communications before are now being provided with such communications. Such users are unsophisticated in and unknowledgeable about radio communications in general, and many of them find using a modern digital radio transceiver to be a trying experience.

The present invention provides a digital mobile radio transceiver which allows even the most unsophisticated user to simply and easily obtain emergency communications. The transceiver is programmed with "personality" data specifying one or more "systems", each "system" specifying one or more "groups" of or individual radio transceivers. For example, a police radio might be programmed with a first "system" specifying groups of and individual police radio units, and a second "system"

specifying groups of and individual fire radio units. Each system is identified by a one or two digit number (e.g., 1-N), and each group is identified with a one or two digit number (e.g., 1-M). Systems are selected by operating a first selector switch, and groups are selected by operating a second selector switch. The transceiver simultaneously displays the "group" and "system" which have been selected.

The repeater system includes one or more group identification codes which uniquely designate an emergency communications handler (e.g., an emergency dispatch operator). The group designated by the group selector switch position "9" of each system programmed into the radio transceiver corresponds to this emergency group identification code. Moreover, the "system" designated by system selector switch "11" has only one "group"—the emergency group identification code corresponding to the group selector position "9".

In the preferred embodiment, the transceiver displays selected "group" first and selected "system" second. Whenever the user operates the selector switches to select the group "9" and the system "11" (causing the transceiver to display "911"), the emergency group identification code is selected. Similarly, whenever the user selects group "9" and any system, the emergency operator is selected; and whenever the user selects system "11", he can only select group "9" corresponding to the emergency operator.

Since users typically associate both the number "9" alone and the number "911" with emergency communications (from their experience with Citizen's Band radio and telephone number conventions), they do not need to remember any new special codes in order to use the radio transceiver provided by the present invention to reach an emergency operator. Moreover, the user only needs to select either group="9" or system="11" in order to reach an emergency operator—making it very easy for even unsophisticated users to obtain emergency communications.

BRIEF DESCRIPTION OF THE DRAWINGS

These and other features and advantages of the present invention will be better and more completely understood by referring to the following detailed description of presently preferred exemplary embodiments in conjunction with the appended sheets of drawings, of which.

DETAILED DESCRIPTION OF PRESENTLY PREFERRED EXEMPLARY EMBODIMENTS

OVERALL SYSTEM ARCHITECTURE

Figure 1:
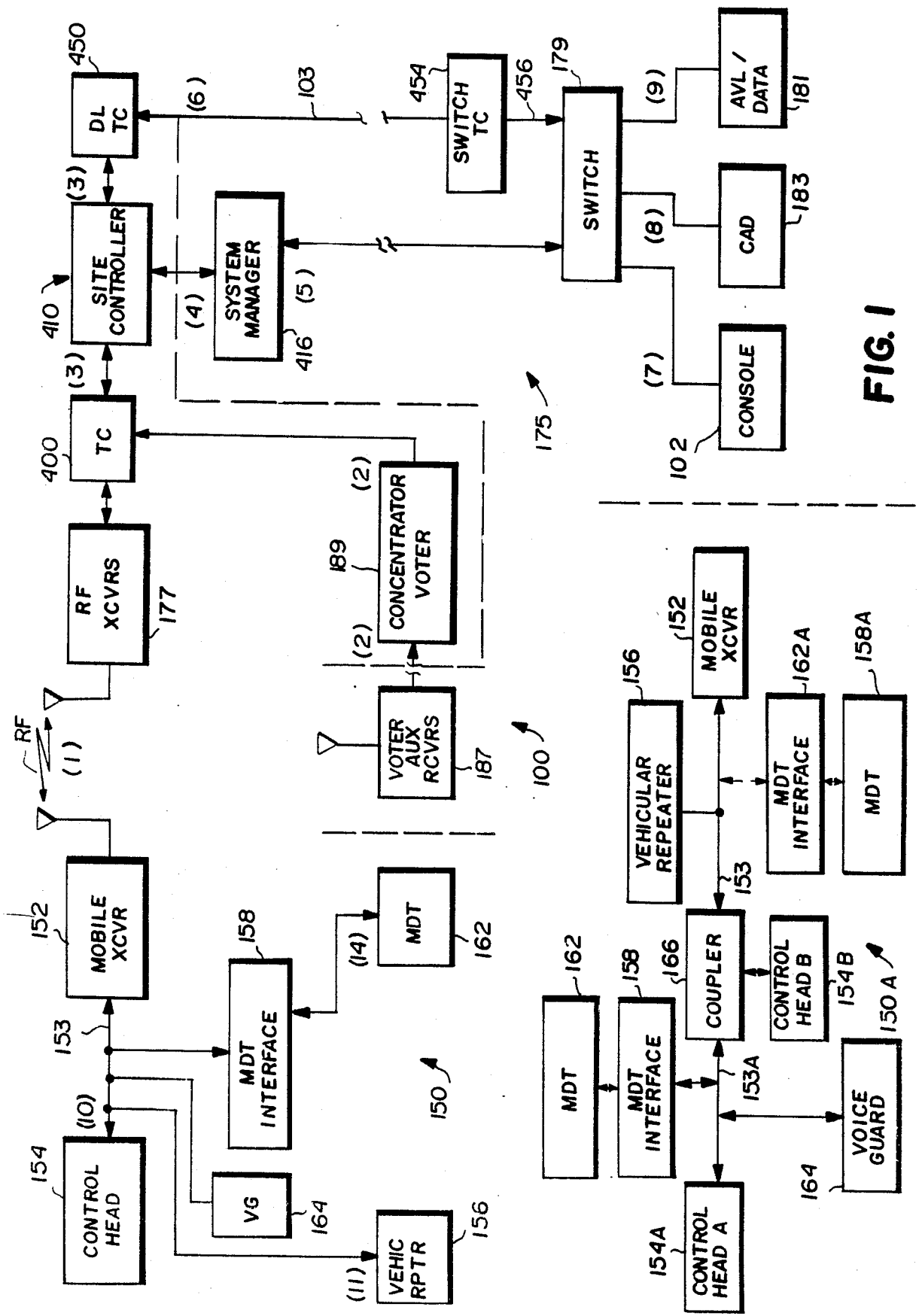
FIG. 1 is a schematic block diagram of an overall trunked radio repeater system 100 of the present invention.

An exemplary trunked radio repeater system 100 in accordance with this invention is generally depicted in FIG. 1. System 100 includes at least one (and typically many) mobile (or portable) radio transceiving stations 150 and an RF repeater station 175. Mobile transceiving station 150 communicates via an RF link and repeater station 175 with other mobile transceiving stations and-/or with landbased parties connected to the repeater station by conventional dial-up landlines.

Repeater station 175 includes a site controller 410, individual repeater channel transceivers 177, and a multiplexing telephone interconnection network ("switch", or "MTX") 179. Site controller 410 is preferably a mainframe digital computer which oversees the general operation of repeater station 175. In particular, site controller 410 controls the operation of RF transceivers 177 by transmitting digital signals to and receiving digital from "trunking cards" ("TC") 400 connected between the site controller and individual transceivers (although only one transceiver 177 and one trunking card 400 are shown in FIG. 1, there typically are many such trunking card/transceiver combinations in repeater station 175—one for each RF channel the repeater station operates on.

Site controller 410 communicates with one or more dispatch consoles 102 via a "downlink" 103 which includes a "downlink" trunking card 450 and a "switch" trunking card 454. The downlink 103 also typically is channeled through switch 179. Also connected to switch 179 are AVL (automatic vehicular locating system) 181 and CAD (computer aided dispatch system) 183. A system manager console/computer station 416 is connected to site controller 410 and to switch 179 to allow a system manager to oversee and control the overall operation of system 100.

A remote receiver 187 and associated concentrator/voter 189 may be connected to trunking card 400 to allow so-called "RSSI" signal strength measurements to be based on the stronger of the signal level received at the central repeater station site and the signal level received at a remote site—thereby increasing the reliability of such measurements.

An RF link ("RF") connects RF transceivers 177 with mobile transceiving stations 150. Mobile station 150 is capable of transmitting digitized voice or digital data signals (encrypted or unencrypted) to and receiving such signals from repeater station 175 over the RF link.

In the configuration shown in the upper left-hand portion of FIG. 1, mobile station 150 includes a mobile RF transceiver 152 connected to a control head 154 via a serial digital bus 153. Mobile transceiver may also be connected to a vehicular repeater 156 via the serial bus. A mobile data terminal interface 158 may connect the serial bus to a mobile data terminal (MDT) 162. A separate digital voice guard module 164 performs data encryption and decryption on digitized voice and/or digital data signals using the conventional DES algorithm.

In the alternate mobile radio configuration shown in the lower left-hand corner of FIG. 1, a coupler 166 is used to connect dual control heads 154A, 154B to serial bus 153. In this configuration, a mobile data terminal 162 and associated interface 158 may be connected directly to serial bus 153 and/or to bus 153A (on the output of the coupler 166). Voice guard module 164 is preferably connected to bus 153A when dual control heads 154A, 154B and associated coupler 166 are used.

As illustrated, individual radio units (mobile or portable radio transceivers) of various groups communicate with one other (both within and possibly outside of their own groups) via shared radio repeater channels. A dispatch console 102 supervises the operation of repeater system 102. There may be multiple dispatch consoles 102 (one for each separate fleet of mobile/portable units) and a master or supervisory dispatch console for the entire system if desired.

OVERALL DESCRIPTION OF MOBILE TRANSCEIVER 152

The 16-PLUS MOBILE RADIO TRANSCEIVER 152 used in the preferred embodiment is a microprocessor-controlled digital radio transceiver having a variety of advanced functions and using the RF signalling protocol described in copending commonly-assigned application serial No. 056,922 of Childress et al entitled "Trunked Radio Repeater System" (Attorney Docket No. 46-66; Client Reference No. 45-MR-539) filed June 3, 1987.

Figure 2:
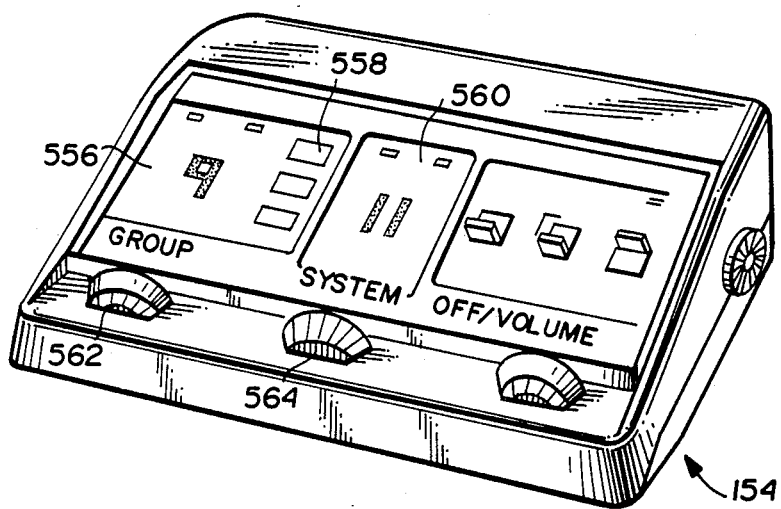
FIG. 2 is a perspective view of the mobile radio transceiver control head shown in FIG. 1.
Figure 3:
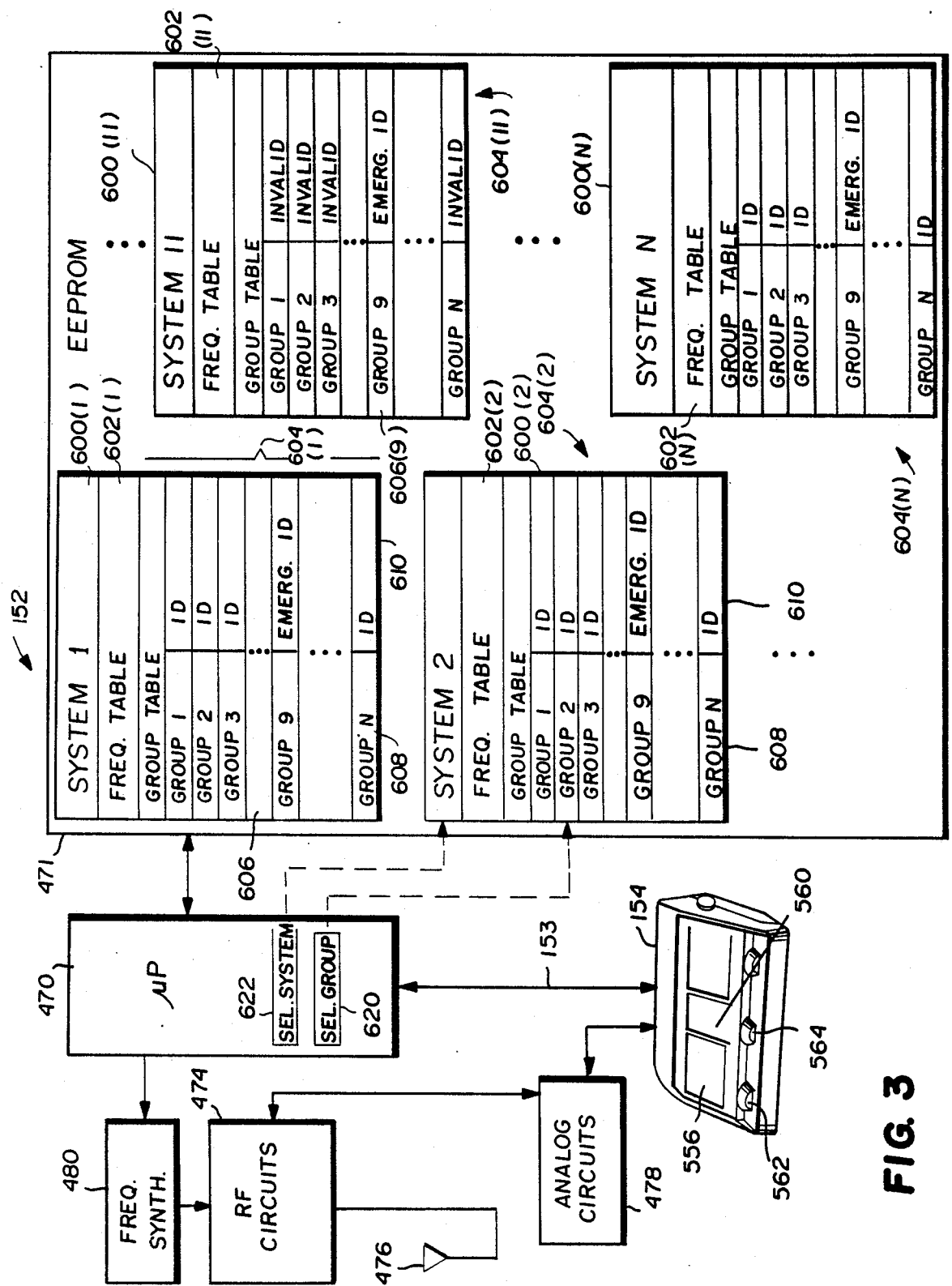
FIG. 3 is a more detailed block diagram of the mobile radio transceiver and control head.

FIGS. 2 and 3 show transceiver 152 and control head 154. Transceiver 152 includes microprocessor 470 (an 8031 microprocessor in the preferred embodiment), and including internal or external read only memory and random access memory device 471 storing "personality" data specifying parameters of repeater systems 100 mobile transceiver 152 is authorized to access (and also storing program control instructions which control the microprocessor to perform predetermined control tasks under software control). Transceiver RF circuits 474 receive RF signals from an antenna 476, demodulate those RF signals to extract the intelligence they carry, pass resulting received analog signals to analog circuits 478, and pass received digital signals to the microprocessor 470. RF circuits 474 similarly receiver digital signals from microprocessor 470 and analog signals from analog circuits 478, produce an RF signal, modulate the RF signal with these analog and digital signals, and transmit the modulated RF signals (after amplification) to the repeater station via antenna 476.

The structure and operation of analog circuits 478 and RF circuits 474 are conventional and well understood by those skilled in this art. Briefly, analog circuits 478 include an audio multiplexer which selects between various audio inputs (e.g., the audio produced by a control head microphone, decrypted voice guard audio information provided by a voice guard module, receiver audio provided by RF circuits 474, and alert tones provided by microprocessor 470). Analog circuits 478 also include a summing device which sums the selected audio input with various digital signals provided by microprocessor 470, a level adjusting circuit which adjusts the level of the summed analog signal, and various amplifier/limiter stages which prepare the level-adjusted signal for use by RF circuits 474 to modulate the RF carrier and/or for application to control head speaker. RF circuits 474 include a conventional digitally-controlled frequency synthesizer 480 controlled by digital data signals produced by microprocessor 470 and conventional RF transmitting and receiving circuitry (e.g., an intermediate frequency "strip" connected to an FM demodulator/detector, and an RF transmitter and associated modulating and RF amplifier stages).

Control head 154 includes its own microprocessor, a digital data "group" display 556, a digital data "system" display 560, a keyboard 558, a "group" selector switch 562 and a "system" select switch 564. Control head 154 is connected to transceiver microprocessor 470 via a 3-wire serial data bus 153. Audio lines 562 connect control head microphone 550 and control head speaker 552 to transceiver analog circuits 478.

Referring now more particularly to FIG. 3, EEPROM 471 (which is preferably programmed at the time mobile transceiver 152 is installed in the field using a conventional "suitcase" programmer) contains "personality" digital data defining the operation of the transceiver (e.g., operating RF frequencies, and identification codes of groups of and individual radio transceivers the programmed receiver is authorized to contact). Each transceiver 152 is preprogrammed to recognize an individual transceiver identification code uniquely corresponding to it. In addition, transceiver 152 is preprogrammed to recognize itself as being a member of one or more logical "groups" of radio transceivers.

Transceiver EEPROM 471 stores a plurality of system data blocks 600, each data block including a frequency table 602 and a group table 604. System blocks 600 correspond to (a) different logical collections of groups of and/or individual radio transceivers, (b) different repeater sites, or (c) both.

Frequency tables 602 store channel numbers and associated frequencies of a plurality (typically 20) of RF channels a specific repeater site operator on. Group tables 604 include a plurality of group records 606. Each group record 606 contains a group number field 608 (corresponding to the number displayed on control head group display 556 when the group record is selected), and an identification code field 610 (which uniquely identifies the corresponding group of or individual transceivers with a digital identification code). System blocks 600 are, like group records 606, uniquely numbered (e.g., 1-N), these numbers corresponding to the number displayed on control head system display 560 when the system is selected.

Transceiver EEPROM 471 may be programmed to permit contact with the same groups of or individual radio transceivers via different radio repeater sites. These different sites are selected by the "system" selection switch 564 in the preferred embodiment. Typically, different sites will have different radio channel frequencies allocated to them (so that the sites can be geographically proximate to one another and yet operate simultaneously on a non-interfering basis). In such case, EEPROM 471 would include several data blocks 600, each block containing identical group tables 604 but containing different frequency tables 602, the different frequency tables specifying the RF channel frequencies of corresponding different radio repeater sites.

EEPROM 471 may also be programmed to contact different collections of groups of and/or individual radio transceivers, these different collections also being specified by different "systems." For example, a police radio might be programmed to contact other police radios when operating in "system 1," to contact county service vehicles when operating in "system 2," and to contact fire services when operating in "system 3." EEPROM 471 of such transceivers would include different system data blocks 600 corresponding to different collections of groups of and/or individual radio transceivers. If the same repeater site were to be used for each different collection, the frequency tables 602 of the various system data blocks 600 would all be identical, but the group tables 604 would differ.

Although FIG. 3 shows group number fields 608 being explicitly stored, they need not be. For example, microprocessor 470 preferably includes a selected group register 620 which is loaded with the numerical designation of a group selected by group selector switch 562; and a selected system register 622 containing the numerical designation of a system selected by system selector switch 564. The contents of selected group register 620 is displayed on control head group display 556, and is also used to "point" or "index" a group record 606 within the selected system data block 600. Similarly, the contents of selected system register 622 are displayed on control head system display 560, and are also used to index one of system data blocks 600 stored in EEPROM 471. Hence, the combination of the setting of group selector switch 562 and the setting of system selector switch 564 uniquely specifies both a system data block 600 and a group record 606 within the selected system data block.

In addition, although FIG. 3 shows system data blocks 600 each including an explicitly stored frequency table 602 and an explicitly stored group table 604, the preferred embodiment actually stores each unique frequency table only once and each unique group table 604 only once, and then stores addresses or other designations of the frequency and group tables in system data blocks 600. This database structure avoids the need to store multiple identical copies of the same frequency tables and multiple identical copies of the same group tables 604 in EEPROM 471 (since different systems typically use the same frequency table with different group tables; and different systems typically use the same group table with different frequency tables).

In the preferred embodiment, system data blocks are designated by integers 1-N. The system data block 600 (11) is a reserved system block which includes only one "valid" group record 606 in its group table 604—a record corresponding to group number "9." Preferably, system data block 600 (11) frequency table 602 contains the RF channel numbers and corresponding frequencies for the repeater site the user of radio transceiver 152 is most likely to use. All the other group records 606 stored within system data block 600 (11) group table 604 specify "invalid" (e.g., all zeros) group identification codes except for group record (9), which contains the identification code corresponding to the emergency dispatch operator. Transceiver microprocessor 470 prevents a user from selecting a group record 606 containing an invalid identification code—and forces selected group register 620 (and thus also, control head group display 556) to contain a group number corresponding to a record storing a valid code.

Whenever system selector switch 564 is rotated to select system number 11 (i.e., to select system data block 600 (11), transceiver microprocessor 470 examines the group records in the selected system data block, and finding that all of the records except for the one corresponding to group number 9 contain invalid group identification codes, forces selection of group record 604 (9) and forces control head group display 556 to display the number "9." The group identification code field 610 (9) of this selected group record 606 contains an identification code of an emergency dispatch operator or other emergency radio unit.

Consequently, whenever the user selects system number 11, emergency group number 9 is automatically selected, the number "9" is displayed on control head group display 556, and transceiver 152 initiates a call to the emergency dispatch operator when the user then depresses the microphone push-to-talk button.

Regardless of the nature of the groups specified in group tables 604 of system data blocks 600 other than system data block 600 (11), the group record 606 (9) in each and every system data block 600 stored in EEPROM 471 has an identification code field 610 containing the identification code of that same emergency dispatch operator. No matter which system data block 600 is selected by select system register 622, select group register 620 selects a group record 606 (9) containing the identification code of the emergency dispatch operator whenever the user selects group number "9."

Transceiver 152 thus permits a user to very easily establish communications with the emergency dispatch operator. Whenever the user selects group number "9" (an easy-to-remember number which the user probably already associates with emergency communications because of its Citizen's Band connotations), transceiver 152 selects the identification code corresponding to the emergency dispatch operator. Similarly, whenever the user selects system number "11," transceiver 152 automatically selects group number "9," displays the combined group/system designation "911" (see FIG. 2)—which the user no doubt already associates with emergency communications from its telephone system connotations—and similarly selects the identification code of the emergency dispatch operator.

Figure 4:
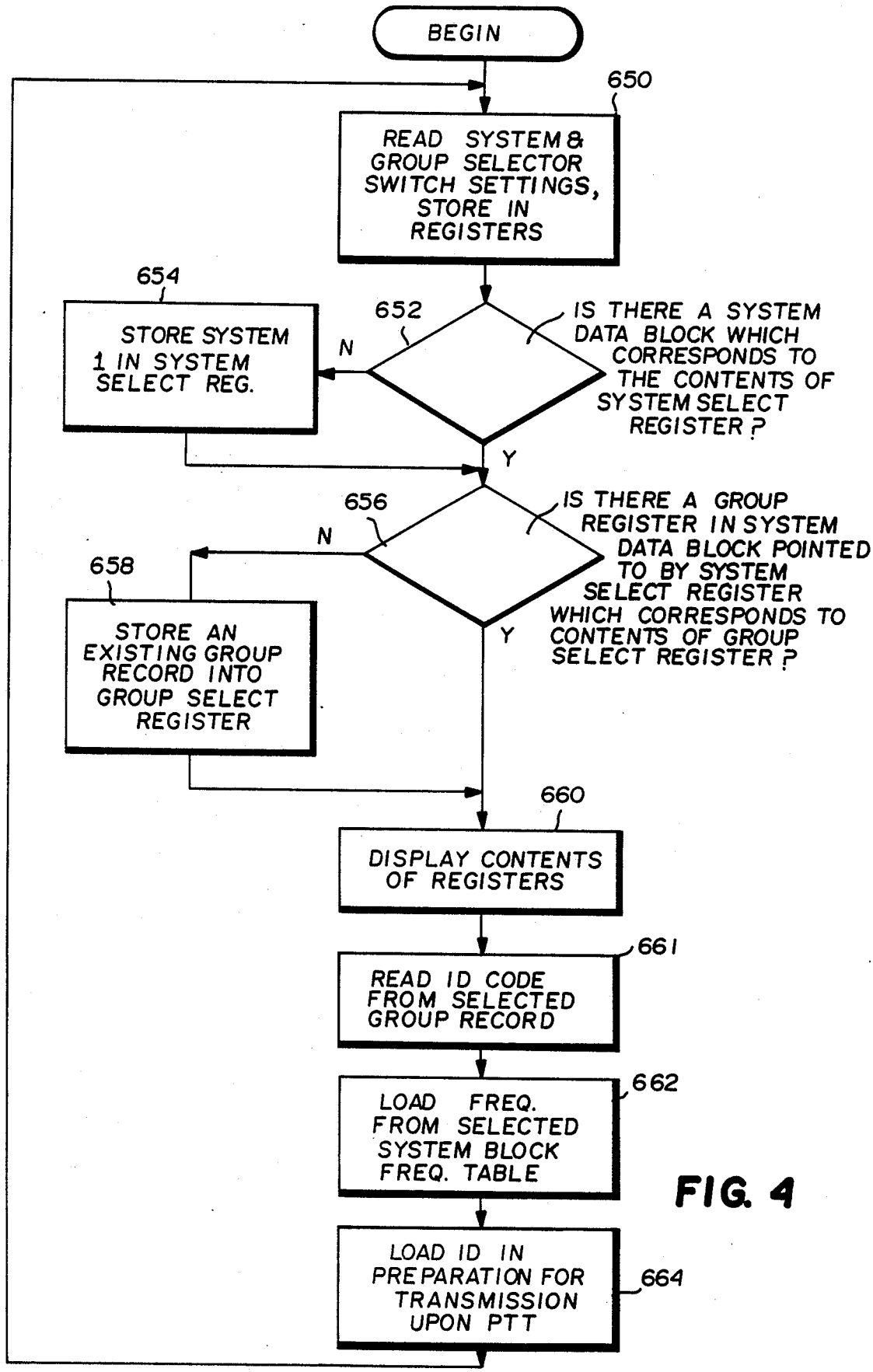
FIG. 4 is a flow chart of exemplary program control steps performed by the transceiver microprocessor shown in FIG. 3.

FIG. 4 is a flowchart of exemplary program control steps performed by transceiver microprocessor 470 in the preferred embodiment to select a group identification code and set of operating frequencies in response to user operation of control head switches 562, 564.

Microprocessor 470 first obtains the current control head group selector switch 562 and system selector switch 564 settings from the control head 154 (e.g., by transmitting messages over serial data bus 153), and loads those settings into microprocessor select group register 620 and select system register 622, respectively (block 650). Microprocessor then attempts to use the contents of select group register 620 to index a system data block 600 stored in EEPROM 471 (block 652). If no system data block exists in EEPROM 471 which corresponds to the contents of select system register 622, microprocessor 470 overwrites the contents of select system register with a designation of a system data block which does exist (e.g., system data block "1") (block 654)

Microprocessor 470 then determines whether the selected system data block 600 includes a group record 606 corresponding to the group number stored in select group register 620 which has a valid group identification code in its ID code field 610 (block 656). If the selected group record does not contain a valid identification code in its ID code field 610, microprocessor 470 overwrites the contents of select group register 620 with the group designation of a group record in the selected system data block which does contain a valid id code (block 658). For example, if select system register 622 selects system data block 600(11), microprocessor 471 overwrites the contents of select group register 620 with a designation of group record 606(9) regardless of the setting of group selection switch 562—since system data block 600(11) contains only one group record having a valid identification code (i.e., the code corresponding to the emergency dispatch operator).

Microprocessor 470 then displays the contents of select group register 620 on control head group display 556, and displays the contents of select system register 622 on control head system display 560 (e.g., by sending appropriate messages to the control head 154 over serial data bus 153) (block 660).

Microprocessor 470 meanwhile reads the group identification code from field 610 of the selected group record 606 in the selected system data block 600 (block 661), loads the frequency table 602 of the selected system data block for use in controlling frequency synthesizer 480 (block 662), and loads the read group identification code into an internal register in preparation for transmitting it within a channel assignment request message over the system RF control channel (specified by the loaded frequency table data) upon depression by the user of a microphone push-to-talk switch (block 664).

The appendix attached hereto sets forth exemplary contents of EEPROM 471 system data blocks 600 for an actual repeater system, and a user chart showing exemplary system and group allocations for an actual system.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

APPENDIX

SYSTEM DATA

| | | | |
|---|---|---|---|
| SET # | 001 | SET # | 007 |
| SITE ID | 01 | SITE ID | 01 |
| LOGICAL ID | 4000 | LOGICAL ID | 4000 |
| TRUNKED GRP SET # | 001 | TRUNKED GRP SET # | 004 |
| TRUNKED FREQ SET # | 001 | TRUNKED FREQ SET # | 001 |
| CONVENTIONAL SET # | 000 | CONVENTIONAL SET # | 000 |
| SET # | 002 | SET # | 008 |
| SITE ID | 02 | SITE ID | 02 |
| LOGICAL ID | 4000 | LOGICAL ID | 4000 |
| TRUNKED GRP SET # | 001 | TRUNKED GRP SET # | 004 |
| TRUNKED FREQ SET # | 002 | TRUNKED FREQ SET # | 002 |
| CONVENTIONAL SET # | 000 | CONVENTIONAL SET # | 000 |
| SET # | 003 | SET # | 009 |
| SITE ID | 01 | SITE ID | DISABLED |
| LOGICAL ID | 4000 | | |
| TRUNKED GRP SET # | 002 | SET # | 010 |
| TRUNKED FREQ SET # | 001 | SITE ID | DISABLED |
| CONVENTIONAL SET # | 000 | | |
| SET # | 004 | SET # | 011 |
| SITE ID | 02 | SITE ID | 01 |
| LOGICAL ID | 4000 | LOGICAL ID | 4000 |
| TRUNKED GRP SET # | 002 | TRUNKED GRP SET # | 005 |
| TRUNKED FREQ SET # | 002 | TRUNKED FREQ SET # | 001 |
| CONVENTIONAL SET # | 000 | CONVENTIONAL SET # | 000 |
| SET # | 005 | SET # | 012 |
| SITE ID | 01 | SITE ID | 02 |
| LOGICAL ID | 4000 | LOGICAL ID | 4000 |
| TRUNKED GRP SET # | 003 | TRUNKED GRP SET # | 005 |
| TRUNKED FREQ SET # | 001 | TRUNKED FREQ SET # | 002 |
| CONVENTIONAL SET # | 000 | CONVENTIONAL SET # | 000 |
| SET # | 006 | SET # | 013 |
| SITE ID | 02 | SITE ID | 03 |
| LOGICAL ID | 4000 | LOGICAL ID | 4000 |
| TRUNKED GRP SET # | 003 | TRUNKED GRP SET # | 000 |
| TRUNKED FREQ SET # | 002 | TRUNKED FREQ SET # | 000 |
| CONVENTIONAL SET # | 000 | CONVENTIONAL SET # | 001 |

GROUP SETS

| SET # | HGRP # | GRP # | GRP/ID | INDV/GRP | ALARM | SET # | HGRP # | GRP # | GRP/ID | INDV/GRP | ALARM |
|---|---|---|---|---|---|---|---|---|---|---|---|
| 1 | 0 | 1 | 0256 | G | N | 2 | 0 | 1 | 0512 | G | N |
| | | 2 | DISABLED | | | | | 2 | DISABLED | | |
| | | 3 | DISABLED | | | | | 3 | DISABLED | | |
| | | 4 | DISABLED | | | | | 4 | DISABLED | | |
| | | 5 | DISABLED | | | | | 5 | DISABLED | | |
| | | 6 | DISABLED | | | | | 6 | DISABLED | | |
| | | 7 | 1137 | G | N | | | 7 | 1137 | G | N |
| | | 8 | 0625 | G | N | | | 8 | 0625 | G | N |
| | | 9 | 0369 | G | N | | | 9 | 0369 | G | N |
| | | 10 | 0272 | G | N | | | 10 | 0528 | G | N |
| | | 11 | 0273 | G | N | | | 11 | 0529 | G | N |
| | | 12 | 0274 | G | N | | | 12 | 0530 | G | N |
| | | 13 | 0275 | G | N | | | 13 | DISABLED | | |
| | | 14 | 0276 | G | N | | | 14 | DISABLED | | |
| | | 15 | 0277 | G | N | | | 15 | DISABLED | | |
| | | 16 | 0278 | G | N | | | 16 | DISABLED | | |
| | | 17 | 0279 | G | N | | | 17 | DISABLED | | |
| | | 18 | 0280 | G | N | | | 18 | 0536 | G | N |
| | | 19 | 0281 | G | N | | | 19 | 0537 | G | N |
| | | 20 | 0288 | G | N | | | 20 | 0544 | G | N |
| | | 21 | 0289 | G | N | | | 21 | 0545 | G | N |
| | | 22 | 0290 | G | N | | | 22 | 0546 | G | N |

-continued

GROUP SETS

| SET # | HGRP # | GRP # | GRP/ID | INDV/GRP | ALARM | SET # | HGRP # | GRP # | GRP/ID | INDV/GRP | ALARM |
|---|---|---|---|---|---|---|---|---|---|---|---|
| | | 23 | 0291 | G | N | | | 23 | 0547 | G | N |
| | | 24 | 0292 | G | N | | | 24 | 0548 | G | N |
| | | 25 | DISABLED | | | | | 25 | 0549 | G | N |
| | | 26 | DISABLED | | | | | 26 | DISABLED | | |
| | | 27 | DISABLED | | | | | 27 | DISABLED | | |
| | | 28 | DISABLED | | | | | 28 | 0552 | G | N |
| | | 29 | 0297 | G | N | | | 29 | 0553 | G | N |
| | | 30 | 0304 | G | N | | | 30 | 0560 | G | N |
| | | 31 | 0305 | G | N | | | 31 | 0561 | G | N |
| | | 32 | DISABLED | | | | | 32 | 0562 | G | N |
| | | 33 | DISABLED | | | | | 33 | 0563 | G | N |
| | | 34 | DISABLED | | | | | 34 | DISABLED | | |
| | | 35 | DISABLED | | | | | 35 | DISABLED | | |
| | | 36 | DISABLED | | | | | 36 | DISABLED | | |
| | | 37 | DISABLED | | | | | 37 | DISABLED | | |
| | | 38 | 0312 | G | N | | | 38 | DISABLED | | |
| | | 39 | 0313 | G | N | | | 39 | DISABLED | | |
| | | 40 | 0320 | G | N | | | 40 | 0576 | G | N |
| | | 41 | 0321 | G | N | | | 41 | 0577 | G | N |
| | | 42 | 0322 | G | N | | | 42 | 0578 | G | N |
| | | 43 | 0323 | G | N | | | 43 | DISABLED | | |
| | | 44 | 0324 | G | N | | | 44 | DISABLED | | |
| | | 45 | 0325 | G | N | | | 45 | DISABLED | | |
| | | 46 | 0326 | G | N | | | 46 | DISABLED | | |
| | | 47 | DISABLED | | | | | 47 | DISABLED | | |
| | | 48 | DISABLED | | | | | 48 | DISABLED | | |
| | | 49 | 0329 | G | N | | | 49 | 0585 | G | N |
| | | 50 | 0336 | G | N | | | 50 | 0592 | G | N |
| 3 | 0 | 1 | 0768 | G | N | 4 | 0 | 1 | 1024 | G | N |
| | | 2 | DISABLED | | | | | 2 | DISABLED | | |
| | | 3 | DISABLED | | | | | 3 | DISABLED | | |
| | | 4 | DISABLED | | | | | 4 | DISABLED | | |
| | | 5 | DISABLED | | | | | 5 | DISABLED | | |
| | | 6 | DISABLED | | | | | 6 | DISABLED | | |
| | | 7 | 1137 | G | N | | | 7 | 1137 | G | N |
| | | 8 | 0625 | G | N | | | 8 | 0625 | G | N |
| | | 9 | 0369 | G | N | | | 9 | 0369 | G | N |
| | | 10 | 0784 | G | N | | | 10 | 1040 | G | N |
| | | 11 | 0785 | G | N | | | 11 | 1041 | G | N |
| | | 12 | 0786 | G | N | | | 12 | 1042 | G | N |
| | | 13 | 0787 | G | N | | | 13 | DISABLED | | |
| | | 14 | 0788 | G | N | | | 14 | DISABLED | | |
| | | 15 | 0789 | G | N | | | 15 | DISABLED | | |
| | | 16 | 0790 | G | N | | | 16 | DISABLED | | |
| | | 17 | 0791 | G | N | | | 17 | DISABLED | | |
| | | 18 | 0792 | G | N | | | 18 | DISABLED | | |
| | | 19 | 0793 | G | N | | | 19 | 1049 | G | N |
| | | 20 | 0800 | G | N | | | 20 | 1056 | G | N |
| | | 21 | 0801 | G | N | | | 21 | 1057 | G | N |
| | | 22 | 0802 | G | N | | | 22 | 1058 | G | N |
| | | 23 | 0803 | G | N | | | 23 | 1059 | G | N |
| | | 24 | 0804 | G | N | | | 24 | 1060 | G | N |
| | | 25 | 0805 | G | N | | | 25 | 1061 | G | N |
| | | 26 | 0806 | G | N | | | 26 | 1062 | G | N |
| | | 27 | 0807 | G | N | | | 27 | 1063 | G | N |
| | | 28 | DISABLED | | | | | 28 | 1064 | G | N |
| | | 29 | DISABLED | | | | | 29 | 1065 | G | N |
| | | 30 | 0816 | G | N | | | 30 | 1072 | G | N |
| | | 31 | 0817 | G | N | | | 31 | 1073 | G | N |
| | | 32 | 0818 | G | N | | | 32 | 1074 | G | N |
| | | 33 | DISABLED | | | | | 33 | DISABLED | | |
| | | 34 | DISABLED | | | | | 34 | DISABLED | | |
| | | 35 | DISABLED | | | | | 35 | DISABLED | | |
| | | 36 | DISABLED | | | | | 36 | DISABLED | | |
| | | 37 | DISABLED | | | | | 37 | DISABLED | | |
| | | 38 | DISABLED | | | | | 38 | DISABLED | | |
| | | 39 | 0825 | G | N | | | 39 | 1081 | G | N |
| | | 40 | 0832 | G | N | | | 40 | 1088 | G | N |
| | | 41 | 0833 | G | N | | | 41 | 1089 | G | N |
| | | 42 | 0834 | G | N | | | 42 | 1090 | G | N |
| | | 43 | 0835 | G | N | | | 43 | 1091 | G | N |
| | | 44 | DISABLED | | | | | 44 | DISABLED | | |
| | | 45 | DISABLED | | | | | 45 | DISABLED | | |
| | | 46 | DISABLED | | | | | 46 | DISABLED | | |
| | | 47 | DISABLED | | | | | 47 | DISABLED | | |
| | | 48 | DISABLED | | | | | 48 | DISABLED | | |
| | | 49 | 0841 | G | N | | | 49 | 1097 | G | N |
| | | 50 | 0848 | G | N | | | 50 | 1104 | G | N |
| | | | | | | 5 | 0 | 1 | DISABLED | | |

-continued

GROUP SETS

| SET # | HGRP # | GRP # | GRP/ID | INDV/GRP | ALARM | SET # | HGRP # | GRP # | GRP/ID | INDV/GRP | ALARM |
|---|---|---|---|---|---|---|---|---|---|---|---|
| | | | | | | | | 2 | DISABLED | | |
| | | | | | | | | 3 | DISABLED | | |
| | | | | | | | | 4 | DISABLED | | |
| | | | | | | | | 5 | DISABLED | | |
| | | | | | | | | 6 | DISABLED | | |
| | | | | | | | | 7 | DISABLED | | |
| | | | | | | | | 8 | DISABLED | | |
| | | | | | | | | 9 | 0369 | G | N |

SYSTEM DATA

| West | East | Agency |
|---|---|---|
| 1 | 2 | Sheriff |
| 3 | 4 | Public Safety |
| 5 | 6 | Public Works |
| 7 | 8 | Local Government |
| 9 | 10 | *Future* |
| 11 | 12 | "911" |
| 13 | 13 | Mutual Aid (Conv) |

LOCAL GOVERNMENT GROUPS

Grp-Sys  Fleet/Subfleet
- [ ] 1-7(8)   LOCAL GOVERNMENT <ALL CALL>
- .
- .
- [ ] 7-7(8)   Dept Heads-County Wide
- [ ] 8-7(8)   County Wide Emergency
- [ ] 9-7(8)   "911"
- [ ] 10-7(8)  PLANNING/DEVELOPMENT <ALL CALL>
- [ ] 11-7(8)  Permits
- [ ] 12-7(8)  Compliance
- .
- .
- [ ] 19-7(8)  Plan/Develop Supervisors
- [ ] 20-7(8)  CENTRAL SERVICES <ALL CALL>
- [ ] 21-7(8)  Central Services Administration
- [ ] 22-7(8)  Bldg Maintenance/Cleaning
- [ ] 23-7(8)  Bldg Maintenance/Service
- [ ] 24-7(8)  Construction
- [ ] 25-7(8)  Telecom Test Group #1
- [ ] 26-7(8)  Telecom Test Group #2
- [ ] 27-7(8)  Telecom Test Group #3
- [ ] 28-7(8)  GE Test Group
- [ ] 29-7(8)  Telecom Information
- [ ] 30-7(8)  PARKS & RECREATION <ALL CALL>
- [ ] 31-7(8)  Parks Security
- [ ] 32-7(8)  Lifeguard
- .
- .
- [ ] 39-7(8)  Parks & Recs Supervisors
- [ ] 40-7(8)  LOCAL GOVERNMENT <ALL CALL>
- [ ] 41-7(8)  Local Government Administration
- [ ] 42-7(8)  Local Government Dept Directors
- [ ] 43-7(8)  Commissioners
- .
- .
- [ ] 49-7(8)  Local Government Special Team
- [ ] 50-7(8)  LOCAL GOVT MOBILE DATA BROADCAST RADIO DATA
Serial # _____
Agency _____
Radio ID # _____

INDIVIDUAL CALLS
1 _____  9 _____
2 _____  10 _____
3 _____  11 _____
4 _____  12 _____
5 _____  13 _____
5 _____  14 _____
6 _____  15 _____
7 _____  16 _____

SHERIFF GROUPS

Grp-Sys  Fleet/Subfleet
- [ ] 1-1(2)   SHERIFF <ALL CALL>
- .
- .
- [ ] 7-1(2)   Dept Heads-County Wide
- [ ] 8-1(2)   County Wide Emergency
- [ ] 9-1(2)   "911"
- [ ] 10-1(2)  PATROL <ALL CALL>
- [ ] 11-1(2)  North Patrol
- [ ] 12-1(2)  East Patrol
- [ ] 13-1(2)  West Patrol
- [ ] 14-1(2)  Traffic Patrol
- [ ] 15-1(2)  Marine
- [ ] 16-1(2)  Headquarters
- [ ] 17-1(2)  Code Enforcement
- [ ] 18-1(2)  Patrol-Tactical
- [ ] 19-1(2)  Patrol-Supervisors
- [ ] 20-1(2)  DETECTIVES <ALL CALL>
- [ ] 21-1(2)  Detective Squad
- [ ] 22-1(2)  SWAT
- [ ] 23-1(2)  Tactical #1
- [ ] 24-1(2)  Tactical #2
- .
- .
- [ ] 29-1(2)  Detective-Supervisors
- [ ] 30-1(2)  NARCOTICS <ALL CALL>
- [ ] 31-1(2)  Narcotics Squad
- .
- .
- [ ] 38-1(2)  Narcotics-Tactical
- [ ] 39-1(2)  Narcotics-Supervisors
- [ ] 40-1(2)  SHERIFF GENERAL <ALL CALL>
- [ ] 41-1(2)  Sheriff Administration
- [ ] 42-1(2)  Warrants
- [ ] 43-1(2)  Civil Process
- [ ] 44-1(2)  Crime Prevention
- [ ] 45-1(2)  Jail Transport
- [ ] 46-1(2)  Road Gang
- .
- .
- [ ] 49-1(2)  Sheriff Special Team
- [ ] 50-1(2)  SHERIFF MOBILE DATA BROADCAST

PUBLIC SAFETY GROUPS

Grp-Sys  Fleet/Subfleet
- [ ] 1-3(4)   PUBLIC SAFETY <ALL CALL>
- .

-continued

|   |         |                            |
|---|---------|----------------------------|
|[ ]| 7-3(4)  | Dept Heads-County Wide     |
|[ ]| 8-3(4)  | County Wide Emergency      |
|[ ]| 9-3(4)  | "911"                      |
|[ ]| 10-3(4) | EMS <ALL CALL>             |
|[ ]| 11-3(4) | ALS/Squad/Boats Dispatch   |
|[ ]| 12-3(4) | EMS Administration         |
|   | .       | .                          |
|   | .       | .                          |
|[ ]| 18-3(4) | EMS-Tactical               |
|[ ]| 19-3(4) | EMS-Supervisors            |
|[ ]| 20-3(4) | FIRE <ALL CALL>            |
|[ ]| 21-3(4) | Fire Dispatch              |
|[ ]| 22-3(4) | Working Fire #1            |
|[ ]| 23-3(4) | Working Fire #2            |
|[ ]| 24-3(4) | Working Fire #3            |
|[ ]| 25-3(4) | Fire Inspection            |
|   | .       | .                          |
|   | .       | .                          |
|[ ]| 28-3(4) | Fire-Tactical              |
|[ ]| 29-3(4) | Fire-Supervisors           |
|[ ]| 30-3(4) | EOC <ALL CALL>             |
|[ ]| 31-3(4) | Emergency Management       |
|[ ]| 32-3(4) | Special Team #1            |
|[ ]| 33-3(4) | Special Team #2            |
|   | .       | .                          |
|   | .       | .                          |
|[ ]| 40-3(4) | PUBLIC SAFETY GENERAL <ALL CALL> |
|[ ]| 41-3(4) | Public Safety Administration |
|[ ]| 42-3(4) | Animal Control             |
|   | .       | .                          |
|   | .       | .                          |
|[ ]| 49-3(4) | Public Safety Special Team |
|[ ]| 50-3(4) | PUB SAFETY MOBILE DATA BROADCAST |

PUBLIC WORKS GROUPS

|   | Grp-Sys | Fleet/Subfleet |
|---|---------|----------------|
|[ ]| 1-5(6)  | PUBLIC WORKS <ALL CALL> |
|   | .       | .              |
|   | .       | .              |
|[ ]| 7-5(6)  | Dept Heads-County Wide |
|[ ]| 8-5(6)  | County Wide Emergency |
|[ ]| 9-5(6)  | "911"          |
|[ ]| 10-5(6) | UTILITIES <ALL CALL> |
|[ ]| 11-5(6) | Engineering    |
|[ ]| 12-5(6) | Customer Service |
|[ ]| 13-5(6) | Distribution   |
|[ ]| 14-5(6) | Meter Reader   |
|[ ]| 15-5(6) | Fresh Water    |
|[ ]| 16-5(6) | Lift Station   |
|[ ]| 17-5(6) | Waste Water Collection |
|[ ]| 18-5(6) | Waste Water Treatment |
|[ ]| 19-5(6) | Utility Construction |
|[ ]| 20-5(6) | HIGHWAYS <ALL CALL> |
|[ ]| 21-5(6) | Road Maintenance-North |
|[ ]| 22-5(6) | Road Maintenance-East |
|[ ]| 23-5(6) | Road Maintenance-South |
|[ ]| 24-5(6) | Traffic Signals |
|[ ]| 25-5(6) | Drainage       |
|[ ]| 26-5(6) | Highway Construction |
|[ ]| 27-5(6) | Engineering    |
|   | .       | .              |
|   | .       | .              |
|[ ]| 30-5(6) | TRANSIT <ALL CALL> |
|[ ]| 31-5(6) | Para Transit   |
|[ ]| 32-5(6) | Bus Service    |
|   | .       | .              |
|   | .       | .              |
|[ ]| 39-5(6) | Transit Supervisors |
|[ ]| 40-5(6) | PUBLIC WORKS GENERAL <ALL CALL> |
|[ ]| 41-5(6) | Public Works Administration |
|[ ]| 42-5(6) | Utilities Administration |
|[ ]| 43-5(6) | Highways Administration |
|   | .       | .              |
|   | .       | .              |
|[ ]| 49-5(6) | Public Works Special Team |
|[ ]| 50-5(6) | PUB WORKS MOBILE DATA BROADCAST |

What is claimed is:

1. A method of operating a mobile radio transceiver comprising:
   (1) selecting a system comprising a preset plurality of groups of radio transceivers, each of said groups corresponding to a different identifier, from among at least two different systems each comprising preset pluralities of groups;
   (2) selecting one of the plurality of groups of radio transceivers within the system selected by said selecting step (1); and
   (3) generating a code identifying an emergency radio station whenever said selecting step (2) selects a group corresponding to a specific predetermined identifier regardless of the system selected by said selecting step (1).

2. A method of operating a mobile radio transceiver comprising:
   (1) selecting a system identification specifying a collection of groups of radio transceivers;
   (2) selecting a group identification designating one of the groups of radio transceivers included in the collection designated by said selected system identification;
   (3) generating a code identifying said group of transceivers selected by said selecting steps (1) and (2);
   (4) displaying said system identification selected by said selecting step (1) and said group identification selected by said selecting step (2);
   (5) selecting a further particular system identification;
   (6) generating a code identifying an emergency radio station in response to selection of the particular system identification regardless of the group identification selected by said selecting step (2); and
   (7) displaying an emergency code in response to selection of said system identification.

3. A mobile radio transceiver including:
   first selecting means for selecting a system identification designating a collection of groups of radio transceivers;
   second selecting means for selecting a group identification "9" designating one of the groups of called radio transceivers in the collection designated by said selected system identification; and
   generating means connected to said first-mentioned and second-mentioned selecting means for generating the same code identifying an emergency radio station in response to the group identification "9" selected by said second selecting means regardless of the system identification selected by said first selecting means.

4. A method as in claim 1 wherein said identifiers each comprise at least one alpha-numeric character, and said predetermined identifier includes the character "9".

5. A method as in claim 4 including displaying the identifier corresponding to said selected group.

6. A method as in claim 1 wherein:
   each system comprising a preset plurality of groups of transceivers has a different identifier associated therewith; and said method further includes generating said code identifying said emergency radio station whenever said selecting step (1) selects a system corresponding to a further specific predetermined identifier regardless of the group selected by said selecting step (2).

7. A mobile radio transceiver including:
memory means for storing predetermined personality data defining the operating characteristics of said transceiver, said personality data defining plural systems each identifying at least one group of and/or at least one individual radio transceivers, said group and/or individual transceivers corresponding to different user selection indicia;
first selecting means operatively connected to said memory means for selecting one of said plural system;
second selecting means operatively connected to said memory means for selecting one of the group of and/or individual transceivers identified by the personality data defining said system selected by said first selecting means in response to selection by a user of user selection indicia corresponding thereto; and
means responsive to said first and second selecting means for establishing radio frequency communications with said selected group of and/or individual transceivers over an RF communication channel in response to both said selected system and said selected group of and/or individual transceiver, and alternatively for establishing communications with an emergency radio transceiver over an RF communication channel in response to selection by a user of a predetermined user selection indicia regardless of the system selected by said first selecting means.

8. A transceiver as in claim 7 wherein:
said first selecting means selects one of said plural systems also in response to selection by a user of a user selection indicia corresponding thereto; and
said communications establishing means also establishes communications with said emergency transceiver in response to user selection of a further predetermined user selection indicia with said first selection means regardless of the group of and/or individual transceivers selected by said second selecting means.

9. A transceiver as in claim 8 wherein said first-mentioned and further user selection indicia correspond to the characters "9" and "11", respectively.

10. A mobile radio transceiver including:
memory means for storing predetermined personality data defining the operating characteristics of said transceiver, said personality data including plural data blocks defining different systems, each system data block including a data record identifying at least one radio transceiver;
user interface means for selecting a system data block in response to selection by a user of a first user indicia and for selecting a data record within said selected data block in response to selection by said user of a second user indicia; and
processor/RF circuit means connected to said user interface means and to said memory means for establishing communication with the radio transceiver identified by said selected data record, and alternately for establishing communication with an emergency radio transceiver if one of said first and second user indicia selected by the user corresponds to a respective preset value regardless of the value of the other of said first and second user indicia selected by the user.

11. A transceiver as in claim 10 wherein said preset value is one of the characters "9" and "11".

12. A method of operating a mobile radio transceiver including:
maintaining predetermined personality data defining the operating characteristics of said transceiver in a memory device, said personality data including plural data blocks defining different systems, each system data block including a data record identifying at least one radio transceiver;
selecting a system data block in response to selection by a user of a first user indicia;
selecting a data record within said selected data block in response to selection by said user of a second user indicia;
establishing communication with the radio transceiver identified by said selected data record; and
inhibiting said first-mentioned establishing step and establishing communication with an emergency radio transceiver instead of said first-mentioned transceiver whenever one of said first and second user indicia corresponds to a respective preset value regardless of the value of the other of said first and second user indicia selected by the user.

13. A method as in claim 12 wherein said preset value is one of "9" and "11".

14. In a radio transceiver of the type storing personality data identifying predetermined other radio transceivers, a method of operating said transceiver comprising:
(1) selecting the setting of a first user control;
(2) selecting the setting of a second user control;
(3) accessing stored personality data identifying a further radio transceiver in response to the selected settings of both said first and said second user controls;
(4) accessing further stored personality data identifying an emergency radio transceiver whenever either of said control settings corresponds to a respective preset setting regardless of the other control setting; and
(5) establishing radio communication with the transceiver identified by the data accessed by said accessing steps (3) and/or (4).

15. A method as in claim 14 wherein said accessing step includes accessing said further stored data whenever the setting of said first control setting corresponds to the character "9" regardless of the setting of said second control setting.

* * * * *